United States Patent
Kim (10) Patent No.: US 8,194,187 B2
(45) Date of Patent: Jun. 5, 2012

(54) DIGITAL BROADCASTING APPARATUS AND METHOD FOR PROVIDING SERVICE THEREOF

(75) Inventor: Mun-seok Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1365 days.

(21) Appl. No.: 11/774,865

(22) Filed: Jul. 9, 2007

(65) Prior Publication Data

US 2008/0170156 A1 Jul. 17, 2008

(30) Foreign Application Priority Data

Jan. 17, 2007 (KR) ........................ 10-2007-0005396

(51) Int. Cl.
*H04N 5/45* (2011.01)

(52) U.S. Cl. ........................................ 348/565; 348/564

(58) Field of Classification Search .......... 348/553–556, 348/563–568
See application file for complete search history.

(56) References Cited

U.S. PATENT DOCUMENTS

| | | | | |
|---|---|---|---|---|
| 7,898,600 B2* | 3/2011 | Lee et al. | ...................... | 348/565 |
| 2006/0132505 A1* | 6/2006 | Shin | .............................. | 345/638 |
| 2008/0024666 A1* | 1/2008 | Sudo et al. | ..................... | 348/565 |

* cited by examiner

*Primary Examiner* — Michael Lee
(74) *Attorney, Agent, or Firm* — Sughrue Mion, PLLC

(57) ABSTRACT

A digital broadcasting apparatus and a method for providing a service thereof are provided. In the digital broadcasting apparatus, a storage unit stores a designated target mode between a picture in picture (PIP) mode and an application mode running a downloaded application program, an embodiment unit provides a PIP function corresponding to the PIP mode and an application function corresponding to the application mode, and a control unit controls the embodiment unit to provide at least any one of the application function and the PIP function, based on the stored target mode, when the PIP function is activated at present.

19 Claims, 5 Drawing Sheets

DIGITAL BROADCASTING APPARATUS AND METHOD FOR PROVIDING SERVICE THEREOF

CROSS-REFERENCE TO RELATED APPLICATIONS

This application claims priority from Korean Patent Application No. 10-2007-0005396, filed Jan. 17, 2007, in the Korean Intellectual Property Office, the entire disclosure of which is hereby incorporated by reference.

BACKGROUND OF THE INVENTION

1. Field of the Invention

Apparatuses and methods consistent with the present invention relate to providing a digital broadcasting, and more particularly, to providing digital broadcasting which continuously displays a picture in picture (PIP) screen even though an application program is received.

2. Description of the Related Art

As digital technologies have been developed, preferences of television (TV) services are moving from unidirectional services to interactive services. A broadcast station provides applications in various forms to a digital broadcasting apparatus, and the digital broadcasting apparatus runs the provided applications and provides functions corresponding to the applications. The applications are programs, such as games, weather information, stock information and the like, and are embodied in, for example, Java programming language.

When a digital broadcasting apparatus provides a PIP function, the digital broadcasting apparatus displays the programs provided by different channels on a screen, through a main screen and a sub screen, by the PIP function. When the digital broadcasting apparatus tunes a specific channel providing an application, the digital broadcasting apparatus runs the provided application to be displayed on the entire screen or a part of the screen.

That is, when the PIP function is operated and the specific channel is tuned, since a related art digital broadcasting apparatus displays a graphic of the application provided from the broadcasting station on the entire screen or a part of the screen, the entire sub screen or a part of the sub screen is overlapped.

Therefore, even if a user desires to continuously watch another channel (program) through the sub screen, the user may be unable to watch the other channel (program) through the sub screen because of the graphic of the application.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a digital broadcasting apparatus which enables a PIP screen, that is, a sub screen, to be continuously displayed at a user's selection even though a channel providing an application is tuned while different programs are provided using a PIP function, and a method for providing a service thereof.

According to an aspect of the present invention, there is provided a digital broadcasting apparatus comprising: a storage unit which stores a designated target mode between a PIP mode and an application mode running a downloaded application program; an embodiment unit which provides services corresponding to the PIP mode and the application mode; and a control unit which controls the embodiment unit to provide at least any one function of the application function and the PIP function, based on the stored target mode, when the PIP function is activated at present.

The control unit may run the application program; when the application program requests a current state of the PIP mode through a first application program interface (API), the control unit may check the current state of the PIP mode to respond to the application program; and when the application program requests a determination of a currently set target mode through a second API, the control unit may determine the target mode stored in the storage unit to respond to the application program.

When it is determined that the stored target mode is the PIP mode, the control unit may control the embodiment unit to terminate the downloaded application program and to maintain a service corresponding to the PIP mode.

When it is determined that the stored target mode is the application mode, the control unit may control the embodiment unit to embody a service corresponding to the application mode.

When the stored target mode is the application mode and the application program is designed to be run together with the PIP mode, the application program may request the control unit to display a graphic of the application program in a region except for a currently displaying PIP screen of the full screen.

The application program may obtain the position and size information of the PIP screen from the control unit, and request the control unit to display the graphic of the application program in the region not corresponding to the obtained position and size information and to maintain the display of the PIP screen.

However, when the stored target mode is the application mode and the application program is designed not to be run together with the PIP mode, the application program may request the embodiment unit to embody a service so that the graphic of the application program is displayed on the full screen.

When the stored target mode is the application mode and the application program is designed not to be run together with the PIP mode, the application program may request the control unit to terminate the PIP mode through a fourth API, and the control unit may control the embodiment unit to end the service corresponding to the PIP mode.

The digital broadcasting apparatus may further comprise: a communication interface unit which downloads the application program from a tuned channel; and a memory unit which stores the downloaded application program, and wherein the control unit may run the stored application program to check the state of the PIP mode and the set target mode.

The application program may be any one of Xlet being transmitted by one of the Advanced Common Application Platform (ACAP) standard and the Open Cable Application Platform (OCAP) standard, and DVB-J being transmitted by the Multimedia Home Platform (MHP) standard.

In accordance with another aspect of the present invention, there is provided a method for providing a service of a digital broadcasting apparatus, the method comprising determining a state of a PIP mode by an application program; when it is determined that a PIP function is currently activated, determining a designated target mode between the PIP mode and an application mode running the application program by the application program; and embodying at least one of the PIP function and the application function, based on the determined target mode.

The determining the state of the PIP mode may comprise calling a first API to check a current state of the PIP mode by the application program; checking the current state of the PIP mode by implementing the called first API; and providing the checked current state of the PIP mode to the application program, so that the application program determines the current state of the PIP mode.

The determining the target mode may comprise calling a second API to determine a currently designated target mode by the application program; determining the designated target mode by implementing the called second API; and providing the determined target mode to the application program.

When it is determined that the target mode is the PIP mode, the method for providing the service of the digital broadcasting apparatus may further comprise terminating the application program and maintaining a service corresponding to the PIP mode.

When it is determined that the target mode is the application mode, the method for providing the service of the digital broadcasting apparatus may further comprise implementing a service corresponding to the application mode.

When the target mode is the application mode and the application program is designed to be run together with the PIP mode, the implementing the service corresponding to the application mode may comprise displaying a graphic of the application program in the region, except for a currently displaying the PIP screen of the full screen, by the application program.

The method for providing the service of the digital broadcasting apparatus may further comprise requesting position and size information of the PIP screen through a third API and obtaining the position and size information of the PIP screen by the application program, and wherein the implementing the service corresponding to the application mode may comprise displaying the graphic of the application program in the region not corresponding to the obtained position and size information of the PIP screen and maintain the PIP screen to be displayed.

However, when the target mode is the application mode and the application program is designed not to be run together with the PIP mode, the implementing the service corresponding to the application mode may comprise processing the graphic of the application program to be displayed in the full screen by the application program.

When the target mode is the application mode and the application program is designed not to be run together with the PIP mode, the method for providing the service of the digital broadcasting apparatus may further comprise requesting termination of the PIP mode through a fourth API by the application program; and ending a service corresponding to the PIP mode.

The method for providing the service of the digital broadcasting apparatus may further comprise downloading the application program from a tuned channel; and storing the downloaded application program, and wherein the state of the PIP mode and the target mode may be checked by running the stored application program.

BRIEF DESCRIPTION OF THE DRAWINGS

The above and other aspects of the present invention will become apparent and more readily appreciated from the following description of the exemplary embodiments, taken in conjunction with the accompany drawings of which.

DETAILED DESCRIPTION OF THE EXEMPLARY EMBODIMENTS OF THE INVENTION

Certain exemplary embodiments of the present invention will be described in greater detail with reference to the accompanying drawings.

In the following description, same drawing reference numerals are used for the same elements even in different drawings. The exemplary embodiments defined in the description, such as detailed construction and elements, are provided to assist in a comprehensive understanding of the invention. However, the present invention can be carried out without those specifically defined matters. Also, well-known functions or constructions are not described in detail since they would obscure the invention with unnecessary detail.

Figure 1:
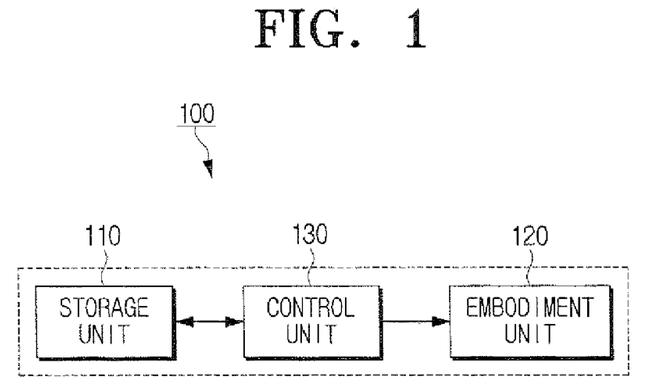
FIG. 1 is a block diagram of a digital broadcasting apparatus according to an exemplary embodiment of the present invention.

FIG. 1 is a view schematically illustrating a digital broadcasting apparatus 100 according to an exemplary embodiment of the present invention.

In FIG. 1, as an apparatus of providing an interactive service, based on the ACAP standard, OCAP standard, or MHP standard, the digital broadcasting apparatus 100 provides the interactive service based on a head end source (not shown), such as a broadcasting station, and the preset standard.

The ACAP standard receives broadcasting signals and data through terrestrial network and transmits the data to service provider through cables, such as LAN. The OCAP standard receives and transmits broadcasting signals and data through one communication channel, such as a cable. The MHP standard is a European data communication scheme.

The digital broadcasting apparatus 100 receives an application program, such as a game, from a broadcasting station by using an API defined in the aforementioned standards and provides the application program to a user by running the received API.

The API includes a set of functions provided for an application program. The API can be embodied in the Java programming language but it is not limited to the Java programming language. The application program is a program providing game, weather information and stock information provided from the head end. For example, Xlet is an application program provided in the ACAP standard and the OCAP standard, and DVB-J is an application program provided in the MHP standard.

The digital broadcasting apparatus 100 can support a PIP function. The PIP function is a function of tuning at least two channels simultaneously and displaying broadcasting programs which are different from or the same as each other. The PIP function displays a plurality of programs or a plurality of application programs through a plurality of main screens and sub screens.

Specifically, when tuning a channel providing an application program while different broadcastings are provided by the PIP function, the digital broadcasting apparatus 100 enables a PIP screen, that is, a sub screen, to be continuously displayed according to a user's selection. For this purpose, the digital broadcasting apparatus 100 comprises a storage unit 110, an embodiment unit 120 and a control unit 130.

The storage unit 110 stores a designated target mode between a PIP mode of performing the PIP function and an application mode of performing an application program downloaded from a broadcasting station. A user sets the target mode through an interface, such as a GUI screen.

The embodiment unit 120 embodies or provides a service corresponding to the PIP mode or the application mode.

When the PIP mode determined upon a request of the downloaded application program is on, the control unit 130 determines the target mode stored in the storage unit 110 and notifies the application program of the target mode. Further, the control unit 130 controls the embodiment unit 120 to embody a service corresponding to at least one of the application mode and the PIP mode, based on the determined target mode.

Figure 2:
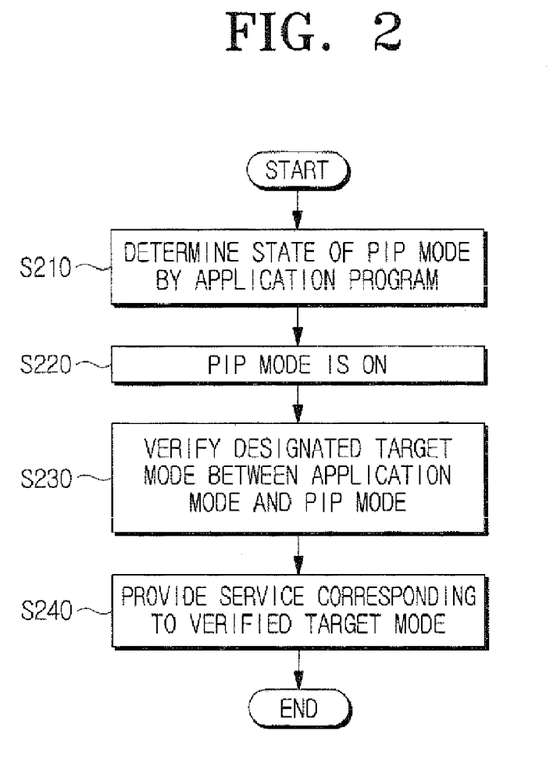
FIG. 2 is a flow chart for explaining a method for providing a service of the digital broadcasting apparatus of FIG. 1.

FIG. 2 is a flow chart for explaining a method for providing a service of the digital broadcasting apparatus 100 illustrated in FIG. 1.

Referring to FIGS. 1 and 2, in operation S210, the application program stored in the storage unit 110 determines a present state of a PIP mode in the digital broadcasting apparatus 100.

In operation S220 when it is determined that the PIP mode is on, in operation S230 the control unit 130 determines a designated target mode between the application mode and the PIP mode and notifies the application program thereof.

In operation S240 the embodiment unit 120 embodies the service corresponding to at least one of the PIP mode and the application mode, based on the determined target mode in the operation S230. More specifically, when the PIP mode is determined as the target mode in the operation S230, the control unit 130 controls the embodiment unit 120 to maintain the PIP mode. Further, when the application mode is determined as the target mode in the operation S230, the control unit 130 controls the embodiment unit 120 to provide only the application mode or to provide the PIP mode and the application mode simultaneously.

Figure 3:
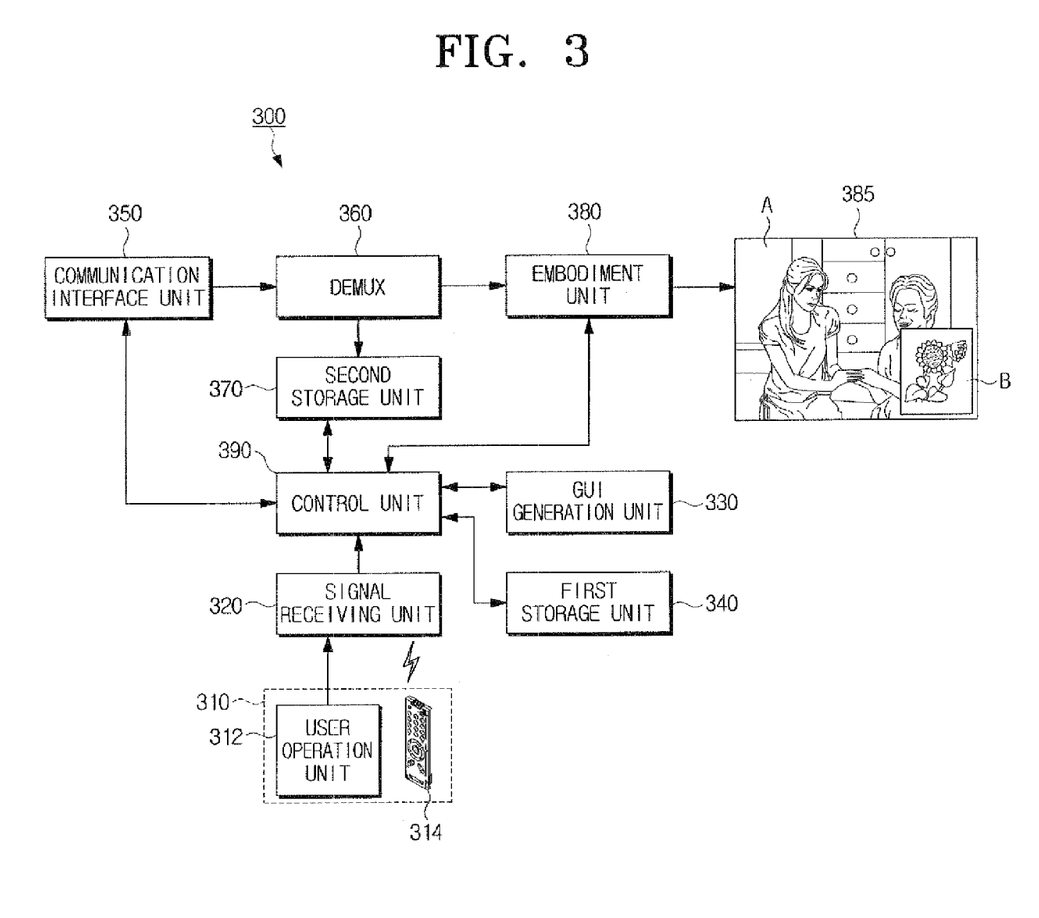
FIG. 3 is a block diagram schematically illustrating a digital broadcasting apparatus according to another exemplary embodiment of the present invention.

FIG. 3 is a block diagram schematically illustrating a digital broadcasting apparatus 300 according to another exemplary embodiment of the present invention.

Referring to FIG. 3, the digital broadcasting apparatus 300 comprises a user interface unit 310, a signal receiving unit 320, a GUI generating unit 330, a first storage unit 340, a communication interface unit 350, a demultiplexer (DE-MUX) 360, a second storage unit 370, an embodiment unit 380, a display unit 385, and a control unit 390.

The user interface unit 310 outputs a key signal which allows a user to request, set or change a specific function supported in the digital broadcasting apparatus 300. The user interface unit 310 has a plurality of buttons, numerical keys, direction keys, functional keys and shortcut keys. The user interface unit 310 includes a user operation unit 312 provided in the digital broadcasting apparatus 300 or a remote controller 314 outputting an infrared signal.

The user interface unit 310 outputs a signal requesting an entry in the PIP mode by a user's operation. Further, a user may operate the user interface unit 310 to request a GUI display like FIG. 4 and designate and change a target mode by using the GUI display. The target mode is a mode with priority between a PIP mode and an application mode running an application program downloaded from a broadcasting station. When a channel for downloading an application program is selected while a user watches TV under the PIP mode, the target mode determines whether to maintain the PIP mode or to run the application mode. Identification information of the designated target mode is stored in the first storage 340.

For example, when entering the PIP mode, the PIP mode is operated through a main screen A and a sub screen B. It may be preferable that the number of main screens or sub screens is not limited to one.

The signal receiving unit 320 receives the key signal transmitted from the user interface unit 310 and outputs it to the control unit 390.

Figure 4:
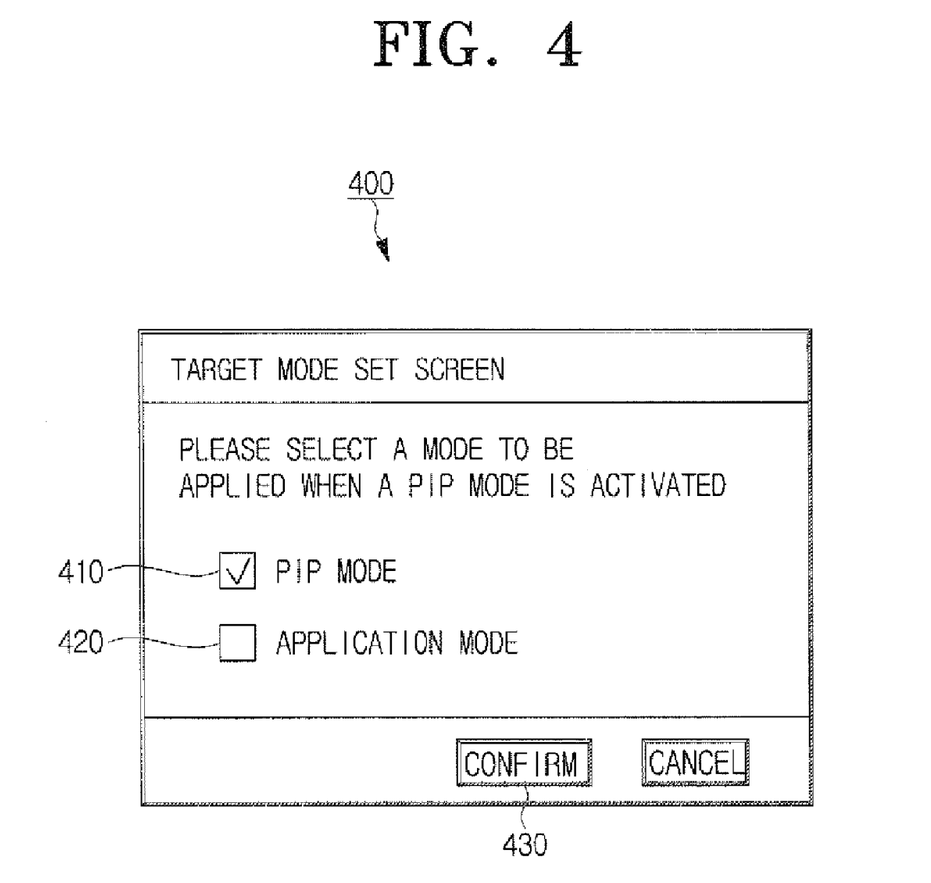
FIG. 4 is an example of a graphical user interface (GUI) for designating and changing a target mode.

When GUI generation to designate a target mode is requested by the user interface unit 310, the GUI generation unit 330 generates a GUI 400 like FIG. 4 and the display unit 385 displays the generated GUI 400.

Referring to FIG. 4, the GUI 400 to designate the target mode between the PIP mode and the application mode displays a message, such as the message that "Please select a mode to be applied when the PIP mode is activated."

Then, when a user clicks a box 410 corresponding to the "PIP mode" by using the user interface unit 310 and selects a "confirm" button 430, the first storage unit 340 stores the identification information indicating that the "PIP mode" is selected as the target mode. Further, when a user clicks a box 420 corresponding to the "application mode" using the user interface unit 310 and selects the 'confirm' button 430, the first storage unit 340 stores the identification information indicating that the "application mode" is selected as the target mode.

The identification information of the target mode stored in the first storage unit 340 can be changed. That is, a user may change the target mode through the GUI 400. Further, the first storage unit 340 stores at least any one of the ACAP standard, the OCAP standard and the MHP standard used in the digital broadcasting apparatus 300.

When the PIP mode is operated, the display unit 385 displays different programs on the main screen A and the sub screen B. When the application mode is operated, the display unit 385 displays the application program only or the application program and the broadcasting program in the PIP mode.

The communication interface unit 350 is an interface communicating with a broadcasting station. The communication interface unit 350 receives the broadcasting program or the application program provided through a selected channel among multiple channels being received.

When the received program is the broadcasting program, the DeMUX 360 outputs the program to the embodiment unit 380, and when the received program is the application program, the DeMUX 360 outputs the program to the second storage unit 370.

The embodiment unit 380 processes the broadcasting program or the application program to be converted into viewable signals and outputs the signals to the display unit 385. For example, the embodiment unit 380 processes a video signal of the broadcasting program to undergo the quality of an image and scales the video signal to be output to the display unit 385. The embodiment unit 380 amplifies an audio signal to be output to a speaker (not shown).

Specifically, the embodiment unit 380 embodies a service corresponding to the PIP mode and the application mode. When the digital broadcasting apparatus 300 is operated in the PIP mode, the embodiment unit 380 processes the programs of two channels selected to be displayed on the main screen A and the sub screen B, respectively. The position and size information of the sub screen B, that is, the additional information of the PIP screen, is stored in the first storage unit 340.

Further, when the PIP mode is on and the application mode is designated as the target mode, the embodiment unit 380 embodies any one of the following two operations, according to the design of the application program.

First, when the application program is designed to be embodied using the additional information of the PIP screen, the embodiment unit 380 configures a graphic by using the additional information of the PIP screen. That is, the embodiment unit 380 configures the graphic so that the application program is displayed on the main screen A and the program being previously displayed is displayed on the sub screen B. Since the application program acquires the position and size information of the PIP screen and provides the same information to the embodiment unit 380, the embodiment unit 380 embodies the application program so as not to be displayed in the region corresponding to the position and size of the PIP screen.

Second, when the application program is designed not to use the additional information of the PIP screen, the control unit 390 controls the embodiment unit 380 to terminate the PIP mode, and the embodiment unit 380 performs a signal process so that the application program is displayed in full screen on the display unit 385.

The second storage unit 370 stores the application program being input from the DeMUX 360.

The control unit 390 controls the overall operations, such as the application program, such as Xlet, native applications and the like which are operated in the digital broadcasting apparatus 300. The native application includes programs other than the application program, such as Xlet, and can be formed by a native programming language including C, C$^+$ and C$^{++}$.

An example of the native application includes an application for the PIP mode. When the PIP mode is requested from the user interface unit 310, the control unit 390 processes signals, transmitted from the selected two channels, by using the native application and controls the embodiment unit 380 to display the processed signals on the main screen A and the sub screen B.

Further, when the application program downloaded through the communication interface unit 350 is stored in the second storage unit 370, the control unit 390 determines the current state of the PIP mode at the request from the application program and notifies the application program of the current state thereof. When the PIP mode is on, the application program requests the determination of the designated target mode, and the control unit 390 determines the target mode stored in the first storage 340 and notifies the application program thereof.

The application program requests the control unit 390 to embody the service corresponding to at least one of the application mode and the PIP mode, based on the determined target mode, and the control unit 390 controls the embodiment unit 380 to embody the service corresponding to at least one of the application mode and the PIP mode upon the request of the application program. Here, the application program requests the current state of the PIP mode through a first API and the determination of the currently designated target mode through a second API.

More specifically, when the application program confirms that the designated target mode is the PIP mode, the application program outputs, to the control unit 390, a signal that the application program is terminated. Then, the control unit 390 terminates the downloaded application program and controls the embodiment unit 380 to maintain the PIP mode. That is, the control unit 390 cancels the tuning of the channel corresponding to the application program and controls the embodiment unit 380 to process the programs of the channels being previously tuned.

When the application program confirms that the designated target mode is the application mode, the application program outputs, to the control unit 390, a signal that a service corresponding to the application mode is run. Then, the control unit 390 controls the embodiment unit 380 to embody the service corresponding to the application mode, that is, to embody the downloaded application program in signals to be seen and heard.

When the designated target mode is the application mode and the application program is designed to be run together with the PIP mode, the application program requests the control unit 390 to display the graphic of the application program on the region except for the currently displayed PIP screen of the full screen on which the graphic of the application program is displayed, that is, except for the sub screen B.

Therefore, the control unit 390 controls the embodiment unit 380 to continuously display the previously output program on the sub screen B and to embody a screen displaying the graphic of the application program on the other screen except for the sub screen. Then, the application program requests the position and size information of the PIP screen from the control unit 390 through a third API and requests the control unit 390 to display the graphic of the application program on the other region, except for the screen with the obtained position and size information.

When the designated target mode is the application mode and the application program is designed not to be run together with the PIP mode, the application program requests the control unit 390 to display the graphic of the application program on the full screen of the display unit 385 and to terminate the PIP mode through a fourth API. Accordingly, the control unit 390 controls the embodiment unit 380 to embody the service of displaying the graphic of the application program on the full screen of the display unit 385 and to end the service corresponding to the PIP mode. Further, the control unit 390 may control the communication interface unit 350 to cancel the tuning of the program being received to be displayed on the sub screen B.

Figure 5:
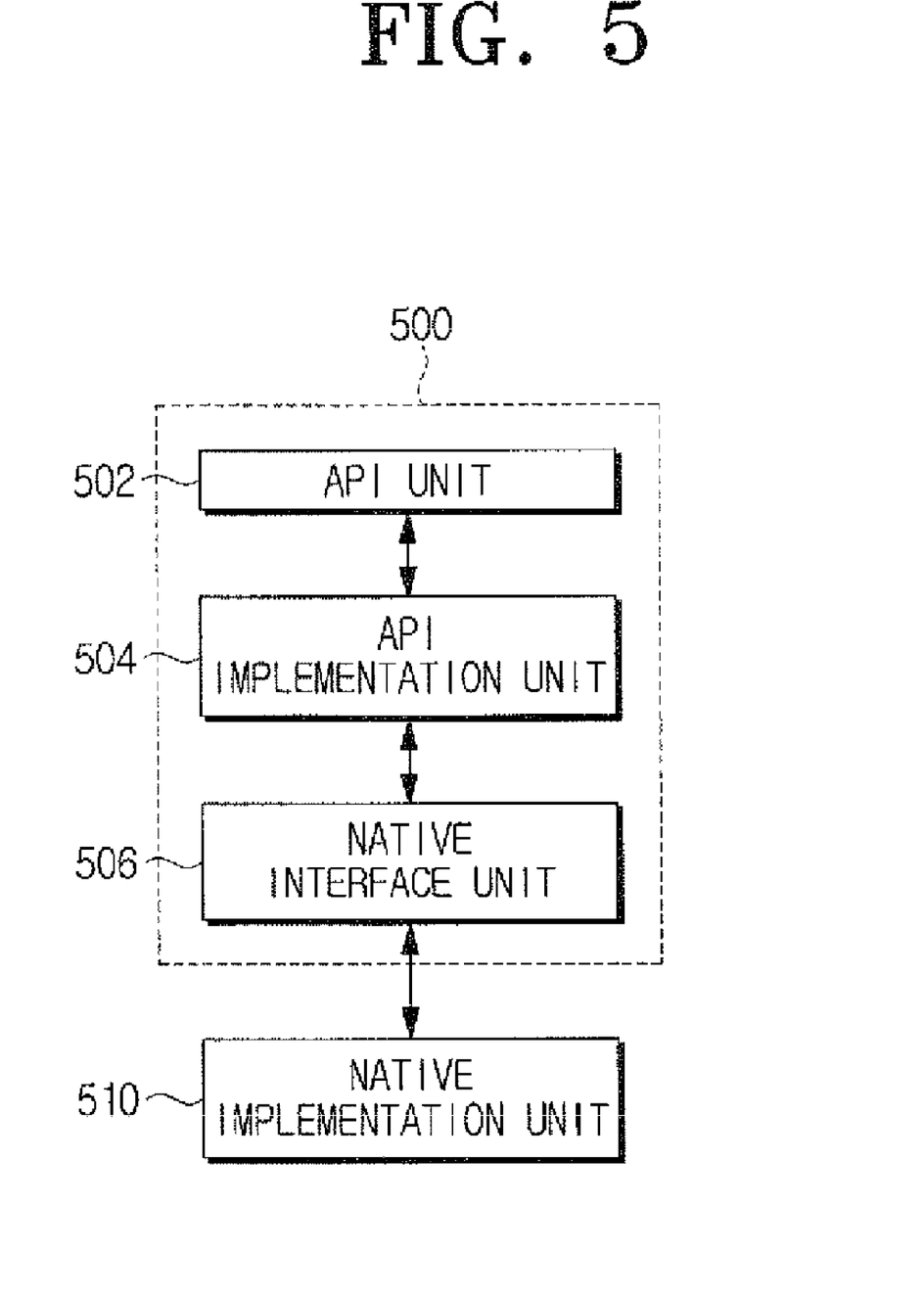
FIG. 5 is a diagram showing a logical structure for explaining an operation of the digital broadcasting apparatus of FIG. 3.

FIG. 5 is a view illustrating a logical structure, to explain the operation of the digital broadcasting apparatus 300 of FIG. 3.

Referring to FIGS. 3 through 5, the logical structure of the digital broadcasting apparatus 300 comprises a platform 500 and a native implementation unit 510.

The platform 500 runs an API called by an application program transmitted from a broadcasting station. For this purpose, the platform 500 comprises an API unit 502, an API implementation unit 504 and a native interface unit 506.

The API unit 502 provides an API requested by the application program stored in the second storage 370. The API is an API designated in the ACAP standard, the OCAP standard or the MHP standard. A different API is provided based on its own function. Specifically, the API unit 502 provides the first API requesting the determination of the current state of the PIP mode, the second API requesting the determination of the currently designated target mode, the third API requesting the additional information of the sub screen B, and the fourth API requesting the termination of the PIP mode.

The first API will be described in detail. When the application program calls the first API to check whether the PIP mode is on in the digital broadcasting apparatus 300, the API unit 502 provides the first API embodied in Java, for example, "IsNativePIPOn," to check the current state of the PIP mode. This means that the API unit 502 instructs the native interface unit 506, which will be described later, to call a first native API corresponding to the first API to check the current state of the PIP mode.

The API implementation unit 504 implements the first API, to provide a function of the first API called from the API unit 502. That is, when the first API is called, the API implementation unit 504 controls the native implementation unit 510 to check the current state of the PIP mode in the digital broadcasting apparatus 300.

The native interface unit 506 interfaces the API implementation unit 504 designed in the Java language and the native implementation unit 510 designed in the native language. More specifically, the native interface unit 506 converts the first API embodied in the Java language into the API embodied in the native language, calls the converted native API by the native implementation unit 510, coverts the information checked in the native implementation unit 510, that is, the current state of the PIP mode, into the API embodied in the Java language, and provides the information converted into the API to the API implementation unit 504.

One or more native implementation units 510 are prepared to realize the function corresponding to the API implemented by the API implementation unit 504. That is, the native implementation unit 510 performs the existing functions embodied in the digital broadcasting apparatus 300, functions provided in the ACAP standard or the OCAP standard, and the like. For this purpose, the native implementation unit 510 has the native API by functions designed in the native language. The native language includes programming languages, such as, C, $C^+$ and $C^{++}$.

For example, the native implementation unit 510 checks the current state of the PIP mode by the first API embodied in the Java language and outputs a result thereof to the native interface unit 506, using the native language. The native interface unit 506 converts the current state of the PIP mode checked in the native implementation unit 510 into the API embodied in the Java language and provides the converted current state thereof to the API implementation unit 504. Accordingly, the current state of the PIP mode is checked in the native implementation unit 510 and is provided to the application program through the native interface unit 506, the API implementation unit 504 and the API unit 502.

When the application program checks that the PIP mode is on, the application program calls the second API to determine the target mode stored in the first storage unit 340. Then, the API unit 502 provides the second API to determine the target mode, and the API implementation unit 504 implements the second API, to provide the function of the second API being called. That is, when the second API is called, the API implementation unit 504 controls the native implementation unit 510 to determine what the target mode is. The native implementation unit 510 determines the designated target mode and outputs the determined target mode to the platform 500.

When the native implementation unit 510 determines that the target mode is the PIP mode, the application program requests the native implementation unit 510 to terminate the application program and to maintain the service corresponding to the PIP mode.

However, when it is determined that the target mode is the application mode, it needs to check whether the application program is designed to be run together with the PIP mode.

First, when it is checked that the application program is designed to be run together with the PIP mode, the application program calls the third API requesting the additional information of the sub screen B. The API unit 502 provides the third API, such as "GetPIPPosition" to check the position information of the sub screen B and "GetPIPSize" to check the size information of the sub screen B. The API implementation unit 504 implements the third API to request the addition information of the sub screen B from the native implementation unit 510.

The native implementation unit 510 checks the additional information of the sub screen B, that is, the size and position information of the sub screen B, and then outputs the information to the platform 500.

When the additional information of the sub screen B is checked by the native implementation unit 510, the application program requests a graphic engine (not shown) to configure the graphic of the application program by using the additional information of the sub screen B. The graphic engine (not shown) configures the graphic of the application program on the full screen but configures the graphic so as not to be displayed on the region where the sub screen B is displayed and to maintain the sub screen B. The actual exemplary embodiment of the graphic engine (not shown) is performed in the embodiment unit 380. When the graphic is configured, a Java application program service in which the PIP mode is maintained is run to be provided to viewers.

Second, when it is checked that the application program is designed not to be run together with the PIP mode, the application program calls the fourth API requesting the termination of the PIP mode. The API unit 502 provides the fourth API, such as "SetPIPOff," to request the termination of the PIP mode. The API implementation unit 504 implements the fourth API being provided to request the native implementation unit 510 to terminate the PIP mode. The native implementation unit 510 terminates the PIP mode based on the fourth API. Consequently, only the service corresponding to the application program is run on the full screen, to be provided to viewers.

Figure 6:
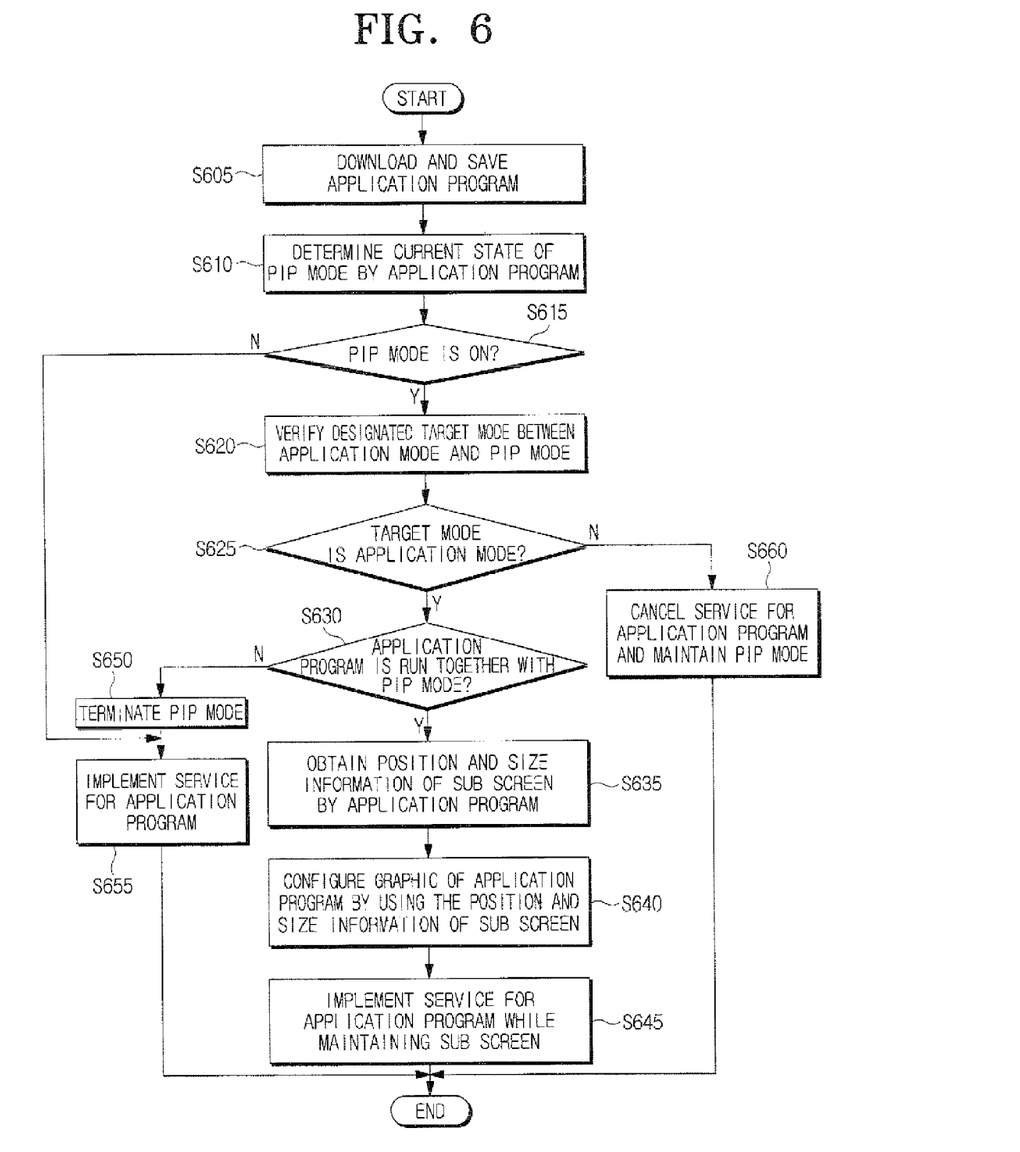
FIG. 6 is a flow chart for schematically explaining a method for providing a service of the digital broadcasting apparatus of FIG. 3.

FIG. 6 is a flow chart for schematically explaining a method for providing a service of the digital broadcasting apparatus of FIG. 3.

Referring to FIGS. 3 through 6, when a user requests to watch a program in a specific channel, in operation S605 the control unit 390 controls the communication interface unit 350 and the second storage unit 370 to download and store an application program from the specific channel.

In operation S610 the stored application program inquires the control unit 390 of the current state of the PIP mode through the first API and then determines the current state of the PIP mode.

When, in operation S615, it is determined that the PIP mode is ON, that is, when it is determined that the PIP mode is activated, in operation S620 the application program determines the designated target mode between the application mode and the PIP mode. The application program inquires the control unit 390 of the target mode through the second API and determines the target mode in the operation S620.

When, in operation S625, the designated target mode in the digital broadcasting apparatus 300 is the application mode, in operation S630 the application program checks whether the application program is designed to be run together with the PIP mode.

When, in the operation S630, it is determined that the application program is designed to be run together with the PIP mode, in operation S635 the application program requests the size and position information of the sub screen B from the control unit 390 and obtains the information.

Then, in operation S640, the application program requests the control unit 390 to configure the graphic of the application program by using the obtained size and position information of the sub screen B. In operation S645, the control unit 390 controls the embodiment unit 380 to display the graphic of the application program on the full screen but to maintain the sub screen B in the region corresponding to the currently displaying sub screen B, and to implement the service corresponding to the application program.

However, when, in the operation S630, it is checked that the application program is designed not to be run together with the PIP mode, the application program requests the control unit 390 to terminate the PIP mode. Accordingly, in operation S650, the control unit 390 terminates the PIP mode which is currently embodied, and in operation S655, controls the embodiment unit 380 to implement the service corresponding to the stored application program.

When, in the operation S625, it is determined that the target mode is the PIP mode, in operation S660 the control unit 390 cancels the service corresponding to the application program and controls the embodiment unit 380 to maintain the PIP mode.

Further, when, in the operation S615, it is checked that the PIP mode is terminated, the control unit 390 progress the operation S655.

As described above, the digital broadcasting apparatus and the method for providing the service thereof, according to the exemplary embodiments of the present invention, makes it possible to continuously display the PIP screen, that is, the sub screen, by the selection of a user when tuning the channel providing an application while a different program is provided by the PIP function.

That is, when a user sets the application mode as the target mode, in accordance with the exemplary embodiments of the present invention, only the Java application mode can be run while the PIP mode is terminated, or the Java application mode and the PIP mode can be run together. Further, when a user sets the PIP mode as the target mode, in accordance with the present invention, only the PIP mode can be run while the Java application mode is terminated.

Therefore, in accordance with the exemplary embodiments of present invention, since the downloaded application program is previously prevented from covering a part of the PIP screen being already embodied or the entire PIP screen, by the selection of a user, the improved quality of services can be provided to viewers.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A digital broadcasting apparatus comprising:
a storage unit which stores one of a picture in picture (PIP) mode and an application mode running a downloaded application program as a designated target mode;
an embodiment unit which provides a PIP function corresponding to the PIP mode and an application function corresponding to the application mode; and
a control unit which determines whether the PIP mode is currently activated, determines the target mode stored in the storage unit if it is determined that the PIP mode is currently activated, and controls the embodiment unit to provide at least one function of the application function and the PIP function based on the determined target mode, wherein the control unit runs the application program;
wherein if the application program requests a current state of the PIP mode through a first application program interface (API), the control unit checks the current state of the PIP mode to respond to the application program, and
wherein if the application program requests a determination of a currently set target mode through a second API, the control unit determines the target mode stored in the storage unit to respond to the application program.

2. A digital broadcasting apparatus comprising:
a storage unit which stores one of a picture in picture (PIP) mode and an application mode running a downloaded application program as a designated target mode;
an embodiment unit which provides a PIP function corresponding to the PIP mode and an application function corresponding to the application mode; and
a control unit which determines whether the PIP mode is currently activated, determines the target mode stored in the storage unit if it is determined that the PIP mode is currently activated, and controls the embodiment unit to provide at least one function of the application function and the PIP function based on the determined target mode, wherein if the stored target mode is the PIP mode, the control unit controls the embodiment unit to terminate the downloaded application program and to maintain a service corresponding to the PIP mode.

3. A digital broadcasting apparatus comprising:
a storage unit which stores one of a picture in picture (PIP) mode and an application mode running a downloaded application program as a designated target mode;
an embodiment unit which provides a PIP function corresponding to the PIP mode and an application function corresponding to the application mode; and
a control unit which determines whether the PIP mode is currently activated, determines the target mode stored in the storage unit if it is determined that the PIP mode is currently activated, and controls the embodiment unit to provide at least one function of the application function and the PIP function based on the determined target mode, wherein if the stored target mode is the application mode, the control unit controls the embodiment unit to provide a service corresponding to the application mode.

4. The apparatus as claimed in claim 3, wherein if the stored target mode is the application mode, and the application program is designed to run together with the PIP mode, the application program requests the control unit to display a graphic of the application program only in a main screen.

5. The apparatus as claimed in claim 4, wherein the application program, through an application program interface (API), obtains position and size information of a PIP screen from the control unit and requests the control unit to display the graphic of the application program only in the main screen based on the obtained position and size information, and to maintain the PIP screen to be displayed.

6. The apparatus as claimed in claim 3, wherein if the stored target mode is the application mode and the application program is designed not to run together with the PIP mode, the application program requests the embodiment unit to provide a service so that a graphic of the application program is displayed on a full screen.

7. The apparatus as claimed in claim 3, wherein if the stored target mode is the application mode and the application program is designed not to run together with the PIP mode, the application program requests the control unit to terminate the PIP mode through an application program interface (API), and the control unit controls the embodiment unit to end the service corresponding to the PIP mode.

8. The apparatus as claimed in claim 1 further comprising:
a communication interface unit which downloads the application program from a tuned channel; and
a memory unit which stores the downloaded application program,
wherein the control unit runs the stored application program to check the state of the PIP mode and the designated target mode.

9. The apparatus as claimed in claim 1, wherein the application program is any one of Xlet being transmitted by one of an Advanced Common Application Platform (ACAP) standard and an Open Cable Application Platform (OCAP) standard, and DVB-J being transmitted by a Multimedia Home Platform (MHP) standard.

10. A method for providing a service of a digital broadcasting apparatus, the method comprising:
determining a state of a picture in picture (PIP) mode by an application program;
if it is determined that the PIP mode is currently activated, determining a designated target mode stored in a storage unit to be the PIP mode or an application mode running the application program by the application program; and
providing at least one of the PIP function and the application function based on the determined target mode,
wherein the determining the state of the PIP mode comprises:
calling an application program interface (API) to check a current state of the PIP mode by the application program;
checking the current state of the PIP mode by implementing the called API; and
providing the checked current state of the PIP mode to the application program so that the application program determines the current state of the PIP mode.

11. A method for providing a service of a digital broadcasting apparatus, the method comprising:
determining a state of a picture in picture (PIP) mode by an application program;
if it is determined that the PIP mode is currently activated, determining a designated target mode stored in a storage unit to be the PIP mode or an application mode running the application program by the application program; and
providing at least one of the PIP function and the application function based on the determined target mode,
wherein the determining the target mode comprises:
calling an application program interface (API) to determine a currently designated target mode by the application program;
determining the designated target mode by implementing the called API; and
providing the determined designated target mode to the application program.

12. A method for providing a service of a digital broadcasting apparatus, the method comprising:
determining a state of a picture in picture (PIP) mode by an application program;
if it is determined that the PIP mode is currently activated, determining a designated target mode stored in a storage unit to be the PIP mode or an application mode running the application program by the application program;
providing at least one of the PIP function and the application function based on the determined target mode; and
if it is determined that the target mode is the PIP mode, terminating the application program and maintaining a service corresponding to the PIP mode.

13. The method as claimed in claim 10 further comprising:
if it is determined that the target mode is the application mode, implementing a service corresponding to the application mode.

14. The method as claimed in claim 13, wherein if the target mode is the application mode and the application program is designed to run together with the PIP mode, the implementing the service corresponding to the application mode comprises displaying a graphic of the application program only in a main screen by the application program.

15. The method as claimed in claim 14 further comprising:
requesting position and size information of a PIP screen through an application program interface (API) and obtaining the position and size information of the PIP screen by the application program, and
wherein the implementing the service corresponding to the application mode comprises displaying the graphic of the application program only in the main screen based on the obtained position and size information of the PIP screen, and maintains the PIP screen to be displayed.

16. The method as claimed in claim 13, wherein if the target mode is the application mode and the application program is designed not to run together with the PIP mode, the implementing the service corresponding to the application mode comprises processing the graphic of the application program to be displayed in a full screen by the application program.

17. The method as claimed in claim 13, further comprising:
if the target mode is the application mode and the application program is designed not to run together with the PIP mode,
requesting termination of the PIP mode through an application program interface (API) by the application program; and
ending a service corresponding to the PIP mode.

18. The method as claimed in claim 10 further comprising:
downloading the application program from a tuned channel; and
storing the downloaded application program,
wherein the state of the PIP mode and the target mode is checked by running the stored application program.

19. The method as claimed in claim 10, wherein the application program is any one of Xlet being transmitted by one of an Advanced Common Application Platform (ACAP) standard and an Open Cable Application Platform (OCAP) standard, and DVB-J being transmitted by a Multimedia Home Platform (MHP) standard.

* * * * *